(12) United States Patent
Matsuyama et al.

(10) Patent No.: US 12,422,398 B2
(45) Date of Patent: Sep. 23, 2025

(54) GAS SENSOR

(71) Applicant: NGK SPARK PLUG CO., LTD., Nagoya (JP)

(72) Inventors: Daisuke Matsuyama, Nagoya (JP); Kunihiko Yonezu, Nagoya (JP); Masashi Nomura, Nagoya (JP); Yuto Inose, Nagoya (JP); Masana Okai, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 394 days.

(21) Appl. No.: 17/800,379

(22) PCT Filed: Apr. 22, 2021

(86) PCT No.: PCT/JP2021/016260
§ 371 (c)(1),
(2) Date: Aug. 17, 2022

(87) PCT Pub. No.: WO2022/074867
PCT Pub. Date: Apr. 14, 2022

(65) Prior Publication Data
US 2023/0074136 A1 Mar. 9, 2023

(30) Foreign Application Priority Data
Oct. 6, 2020 (JP) ................. 2020-168888

(51) Int. Cl.
*G01N 27/409* (2006.01)
(52) U.S. Cl.
CPC ................. *G01N 27/409* (2013.01)
(58) Field of Classification Search
CPC . G01N 27/409; G01N 27/407; G01N 27/4062
See application file for complete search history.

(56) References Cited

U.S. PATENT DOCUMENTS

| 2008/0295576 A1* | 12/2008 | Yamauchi | G01N 27/4062 73/23.31 |
| 2009/0101504 A1* | 4/2009 | Yamauchi | G01N 27/407 204/424 |
| 2017/0179629 A1* | 6/2017 | Hino | G01M 15/104 |

FOREIGN PATENT DOCUMENTS

| JP | 2006-337096 A | 12/2006 |
| JP | 2007047093 A * | 2/2007 |

(Continued)

OTHER PUBLICATIONS

Matsuo et al., English translation of JP-2007047093-A (Year: 2007).*

(Continued)

*Primary Examiner* — Luan V Van
*Assistant Examiner* — Kaylee Tseng
(74) *Attorney, Agent, or Firm* — Sughrue Mion, PLLC

(57) ABSTRACT

A gas sensor (200) including a sensor element (10) having electrode pads (11*a*-12*b*); a separator (166); and a plurality of metal terminals (21*a*, 21*b*, 22*a*, 22*b*) each having a body portion (21*a*1) and a front end portion (21*a*2), and being insulated from each other by the separator. The separator has an element storage portion (168) penetrating in the axial-line direction or recessed toward a rear side from a front facing surface of the separator, the element storage portion has a first storage space (168*a*) at a front side thereof and a second storage space (168*b*) at a rear side thereof, the second storage space has a rotation restriction wall (168*w*) configured such that a relative rotation allowable angle 2θ between the sensor element and the separator is smaller than in the first storage space, and the rear end side of the sensor element is stored in the second storage space.

8 Claims, 13 Drawing Sheets

(56) References Cited

FOREIGN PATENT DOCUMENTS

| | | | |
|---|---|---|---|
| JP | 2010276354 A | * | 12/2010 |
| JP | 2013-181769 A | | 9/2013 |

OTHER PUBLICATIONS

International Search Report for PCT/JP2021/016260, dated Jul. 6, 2021.

* cited by examiner

GAS SENSOR

CROSS-REFERENCE TO RELATED APPLICATIONS

The application is a National Stage of International Application No. PCT/JP2021/016260 filed Apr. 22, 2021, claiming priority based on Japanese Patent Application No. 2020-168888 filed Oct. 6, 2020, the above-noted applications incorporated herein by reference in their entirety.

BACKGROUND OF THE INVENTION

1. Field of the Invention

The present invention relates to a gas sensor including a sensor element for detecting the concentration of a detection target gas.

2. Description of the Related Art

As a gas sensor for detecting the concentration of oxygen or NOx in exhaust gas of an automobile or the like, a gas sensor having a sensor element using solid electrolytes is known.

In some gas sensors of this type, a plurality of electrode pads are provided at the rear end side of a plate-shaped sensor element, an insulating separator is provided so as to surround a radially outer side at the rear end side of the sensor element, and metal terminals are held in the separator (Patent Documents 1 and 2).

The metal terminals are electrically connected to the electrode pads, and the rear end sides of the metal terminals are crimped and connected to lead wires so that a sensor output signal from the sensor element is taken to the outside via the lead wires. The lead wires are led to the outside through a rubber grommet provided at the rear side of the gas sensor.

Patent Document 1: Japanese Patent Application Laid-Open (kokai) No. 2006-337096 (FIG. 4)
Patent Document 2: Japanese Patent Application Laid-Open (kokai) No. 2013-181769 (FIG. 4)

3. Problem to be Solved by the Invention

As shown in FIG. 11, in Patent Document 2, in a case where a sensor element 520 is inserted into a storage space 500h of a separator 500 to assemble a gas sensor, the sensor element 520 is initially held at a position close to a design position 520R. At the design position 520R, electrode pads of the sensor element 520 contact metal terminals 510 almost in parallel thereto, so that the contact areas are maximized and the connection state is favorable.

However, as the gas sensor is used, the separator 500 might rotate in the circumferential direction from the design position 520R due to vibration while operating a vehicle, for example.

As a result of such rotation, as shown in FIG. 12, the metal terminal 510 and an electrode pad 520p of the sensor element 520 might become too close to each other, so that they contact each other obliquely (one-side contact) at a contact part C, leading to contact failure. Meanwhile, if the metal terminal 510 is too far from the electrode pad 520p, the metal terminal 510 fully extends as shown at a part E, so that the contact pressure with the electrode pad 520p is reduced, leading to contact failure.

On the other hand, in a case of a separator 600 described in Patent Document 1 as shown in FIG. 13, a storage space 600h is formed in a straight shape from a front facing surface 600a side toward the rear side (arrow direction in FIG. 13). In other words, the outer edge of the storage space 600h has constant dimensions from the front end toward the rear end.

Then, for example, by providing portions such as a protrusion 600p protruding radially inward in the storage space 600h, circumferential-direction rotation of the separator 600 due to operating vibration or the like can be suppressed, and a sensor element 520 can be kept held in the vicinity of a design position 520R.

However, in this case, since the clearance between the storage space 600h and the sensor element 520 is small, it is difficult to insert the sensor element 520 into the separator 600, thus causing a problem of reducing productivity.

SUMMARY OF THE INVENTION

Accordingly, an object of the present invention is to provide a gas sensor that improves connection reliability between an electrode pad of a sensor element and a metal terminal and that improves productivity in inserting the sensor element into a separator.

In order to solve the above problem, the present invention provides (1) a gas sensor comprising: a sensor element formed in a plate shape extending in an axial-line direction and having main surfaces opposed to each other, the sensor element having two or more electrode pads separate from each other in a width direction at a rear end side on at least one of the main surfaces; a separator made of an insulating material and provided at a rear end side of the sensor element; and a plurality of metal terminals held by the separator and arranged so as to be opposed to the electrode pads, the metal terminals each having a body portion extending in the axial-line direction and a front end portion which is contiguous to a front end of the body portion and connected to the corresponding electrode pad, the metal terminals being insulated from each other by the separator. The separator has an element storage portion penetrating in the axial-line direction or recessed toward a rear side from a front facing surface of the separator. The element storage portion has a first storage space at a front side thereof and a second storage space at a rear side thereof. The second storage space has a rotation restriction wall configured such that a relative rotation allowable angle between the sensor element and the separator is smaller than in the first storage space. Further, the rear end side of the sensor element is stored in the second storage space.

In the gas sensor (1), the rotation allowable angle in the first storage space is greater than the rotation allowable angle in the second storage space. Therefore, at the time of inserting the sensor element into the first storage space of the separator to assemble the gas sensor, even if the sensor element is inserted so as to deviate in the circumferential direction, since the clearance between the first storage space and the sensor element is large, the sensor element can be easily inserted into the separator and thus productivity is improved.

Meanwhile, the rear end side of the sensor element is stored in the second storage space in which the rotation allowable angle is smaller than in the first storage space. Therefore, for example, even when a force causing rotation in the circumferential direction is applied to the separator due to vibration while operating the vehicle, the relative rotation angle with respect to the sensor element held in the second storage space is kept small (within $2\theta$). As a result, a phenomenon is prevented in which the distance between each electrode of the sensor element and its corresponding metal terminal (the front end portions thereof) becomes too short so that they contact each other obliquely (one-side contact) or the distance therebetween becomes too long so that the contact pressure is reduced. Thus, contact failure is suppressed, and reliability in connection between the electrode pads and the metal terminals can be improved.

In a preferred embodiment (2) of the gas sensor (1), the rotation allowable angle in the second storage space is not greater than 90 degrees.

If the rotation allowable angle is greater than 90 degrees, it is difficult to connect all the respective electrode pads and corresponding metal terminals (front end portions), such that a metal terminal might not make contact.

In another preferred embodiment (3) of the gas sensor (2), the rotation allowable angle is not greater than 20 degrees. As a result, contact failure is further suppressed, and reliability in connection between the electrode pads and the metal terminals can be further improved.

In yet another preferred embodiment (4) of the gas sensor of any of (1) to (3) above, the element storage portion is spaced apart from the sensor element.

This configuration of the gas sensor can prevent the sensor element from breaking due to vibration while driving or the like by contacting the element storage portion (in particular, the second storage space).

Advantageous Effects of the Invention

The present invention can provide a gas sensor which improves connection reliability between an electrode pad of a sensor element and a metal terminal, and which improves productivity in inserting the sensor element into a separator.

DESCRIPTION OF REFERENCE NUMERALS

Figure 1:
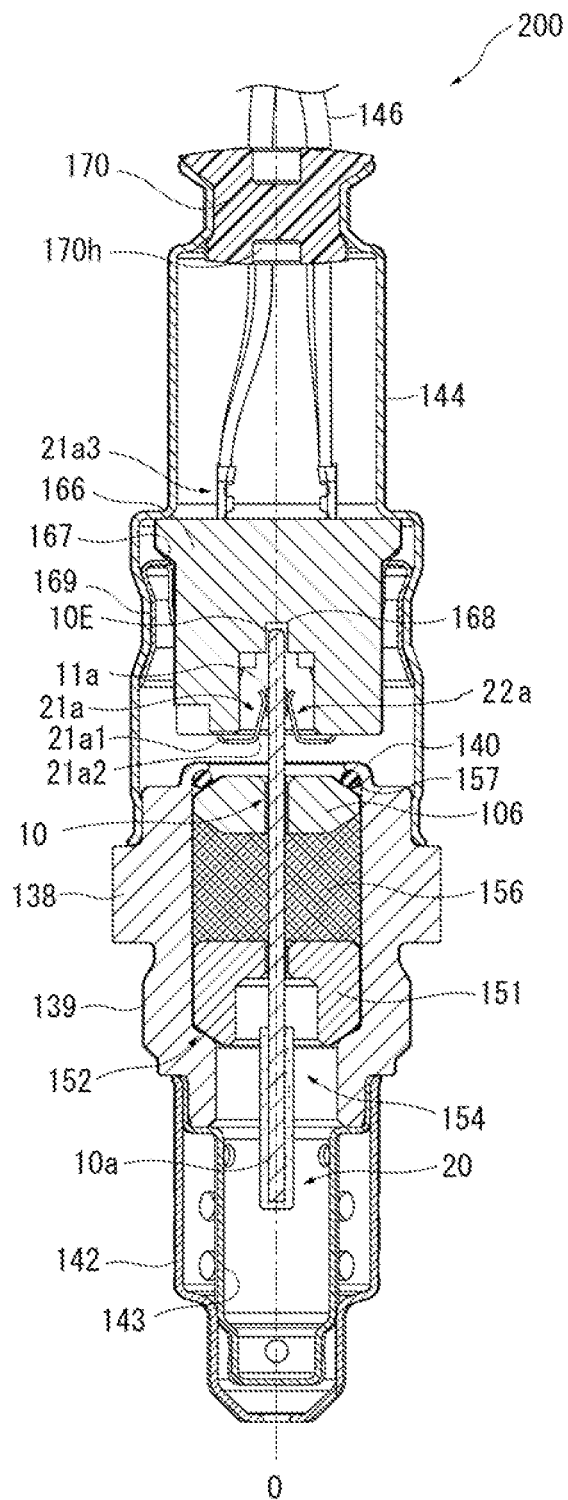
FIG. 1 is a sectional view along a longitudinal direction of a gas sensor according to an embodiment of the present invention.

Reference elements which identify various features in the drawings include the following.
10 sensor element
10A one main surface of the sensor element
10B another main surface of the sensor element
11a, 11b, 12a, 12b electrode pad
21a, 21b, 22a, 22b metal terminal
21a1, 21b1, 22a1, 22b1 body portion
21a2, 21b2, 22a2, 22b2 front end portion
166, 266, 366 separator
166a front facing surface
168, 268, 368 element storage portion
168a, 268a, 368a first storage space
168b, 268b, 368b second storage space
168w, 268w, 368w rotation restriction wall
200 gas sensor
O axial line
2φ rotation allowable angle in the first storage space
2θ rotation allowable angle in the second storage space

DETAILED DESCRIPTION OF THE PREFERRED EMBODIMENTS

Hereinafter, an embodiment of the present invention will be described in greater detail with reference to the drawings. However, the present invention should not be construed as being limited thereto.

Figure 2:
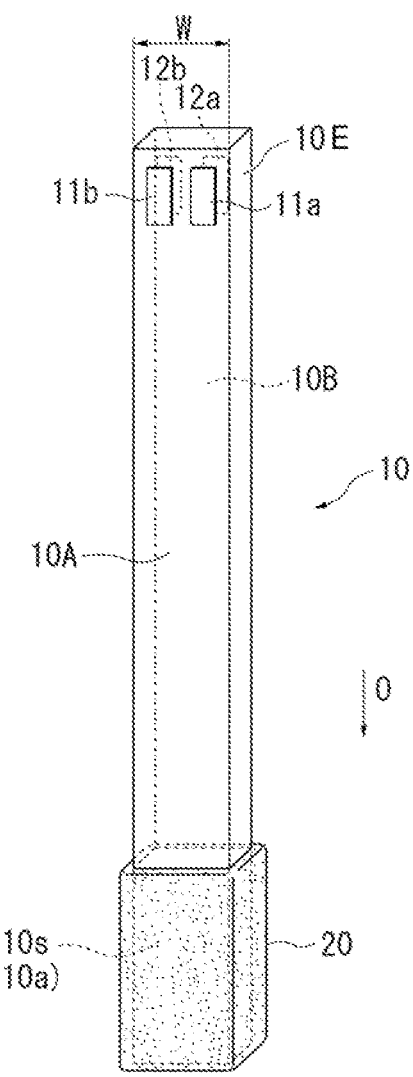
FIG. 2 is a perspective view of a sensor element.
Figure 3:
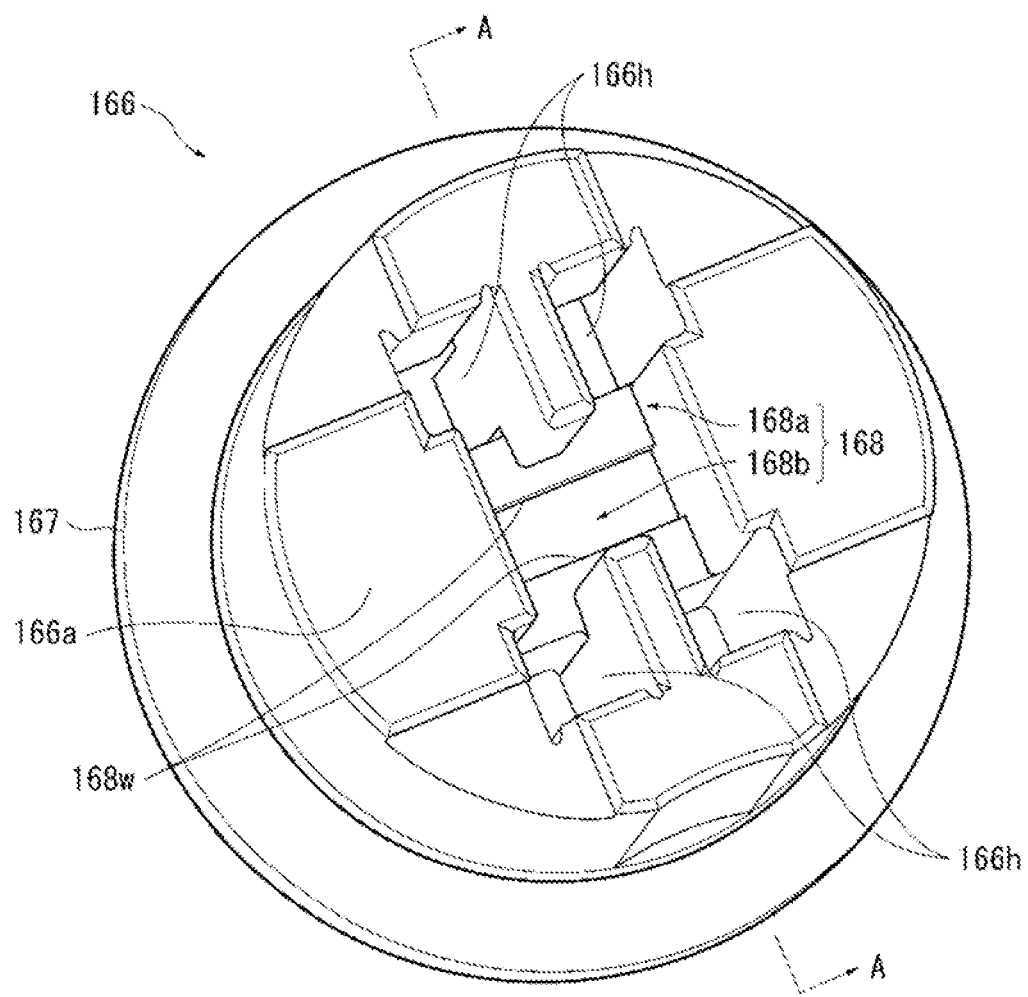
FIG. 3 is a perspective bottom view of a separator as seen from the front side.
Figure 4:
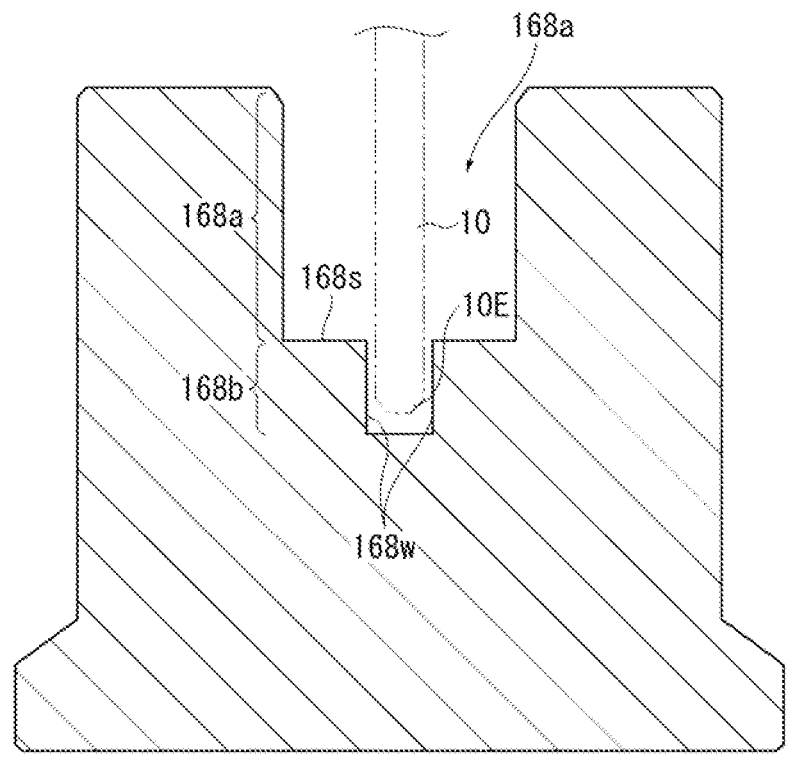
FIG. 4 is a sectional view along line A-A in FIG. 3.
Figure 5:
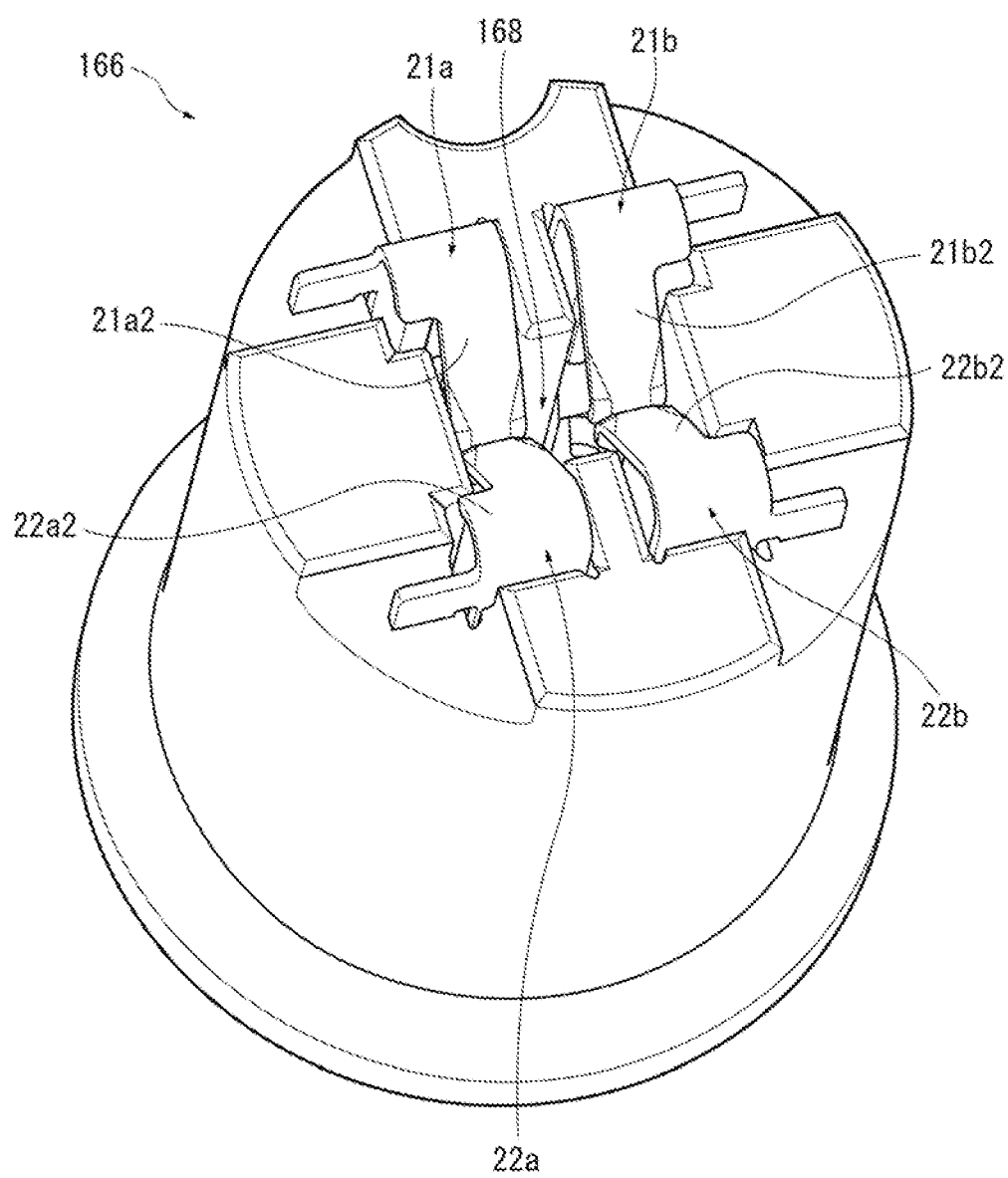
FIG. 5 is a perspective bottom view of the separator at which metal terminals are held in FIG. 3.
Figure 6:
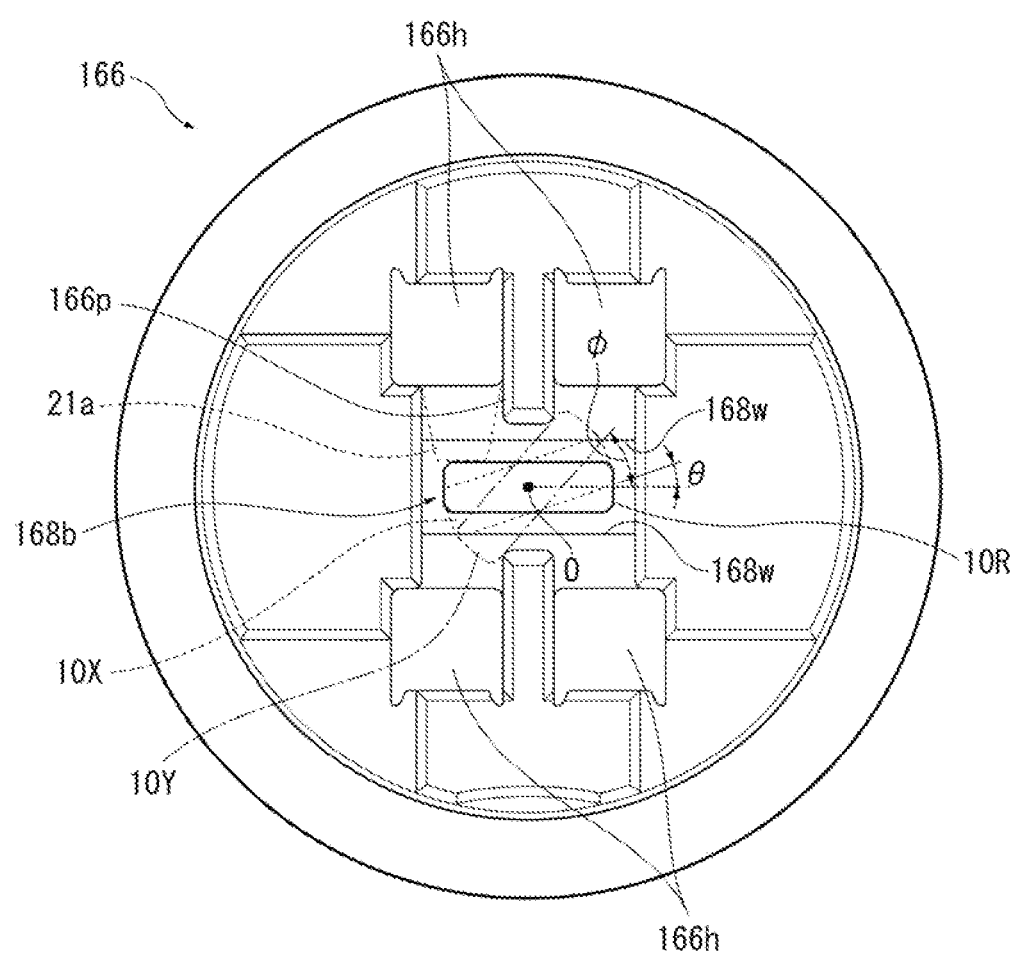
FIG. 6 is a bottom view of the separator showing an element storage portion and a rotation allowable angle of the sensor element as seen from the front side.
Figure 7:
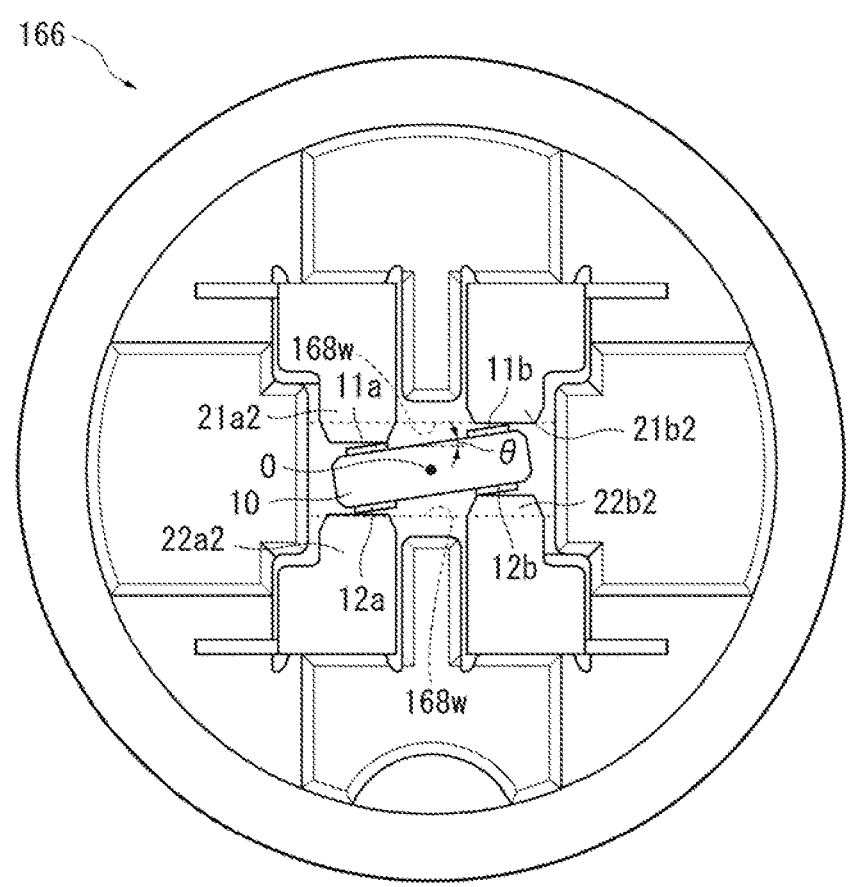
FIG. 7 is a bottom view of the separator showing a connection state between electrode pads of the sensor element and the metal terminals.
Figure 8:
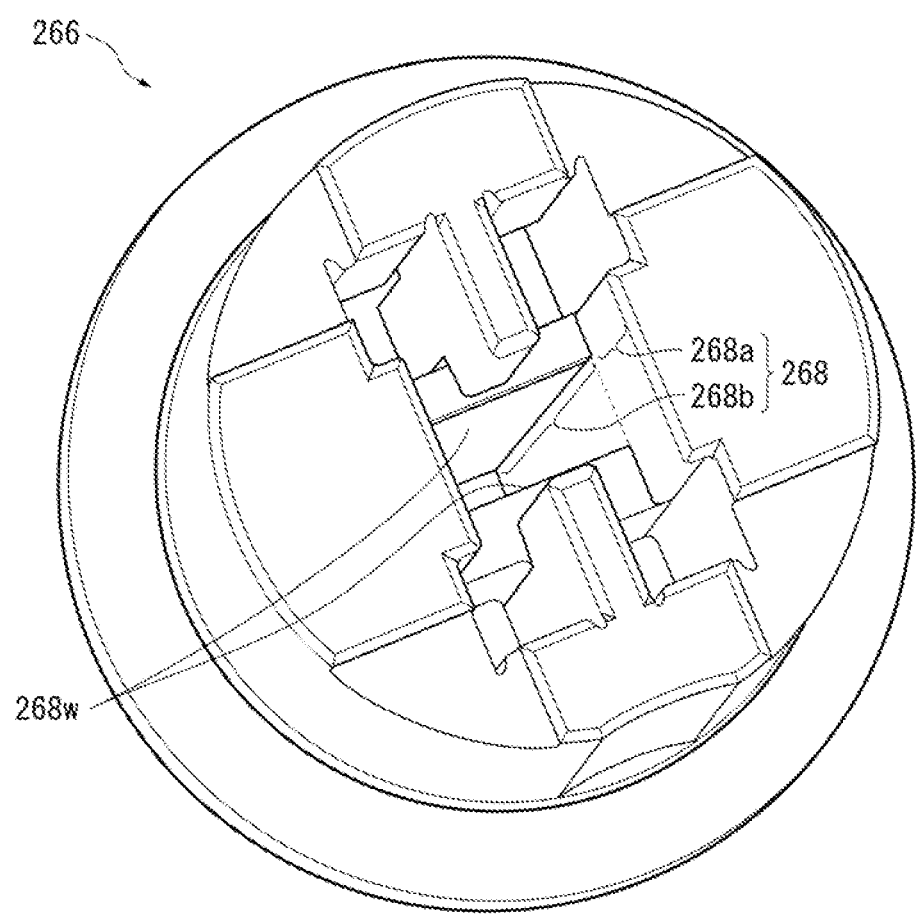
FIG. 8 is a perspective bottom view of a separator in a modification as seen from the front side.

FIG. 1 is an entire sectional view along a longitudinal direction of a gas sensor (oxygen sensor) 200 according to an embodiment of the present invention. FIG. 2 is a perspective view of a sensor element 10. FIG. 3 is a perspective bottom view of a separator 166 as seen from the front side. FIG. 4 is a sectional view along line A-A in FIG. 3. FIG. 5 is a perspective bottom view of the separator 166 at which metal terminals 21a, 21b, 22a, 22b are held in FIG. 3. FIG. 6 is a bottom view of the separator 166 showing an element storage portion 168 and a rotation allowable angle 2θ of the sensor element as seen from the front side. FIG. 7 is a bottom view of the separator 166 showing a connection state between electrode pads of the sensor element and the metal terminals. FIG. 8 is a perspective bottom view of a separator in a modification as seen from the front side.

The gas sensor 200 is an oxygen sensor for detecting the concentration of oxygen in exhaust gas of an automobile or various internal combustion engines.

In FIG. 1, the gas sensor 200 includes: a cylindrical metal shell 138 having, on the outer circumferential surface thereof, a screw portion 139 for fixation to an exhaust pipe; the sensor element 10 having a plate shape extending in the direction of an axial line O (the longitudinal direction of the gas sensor 200, i.e., vertical direction in FIG. 1); a tubular ceramic sleeve 106 provided so as to surround the radial-direction periphery of the sensor element 10; a separator 166 made of ceramic and provided so as to surround the periphery of a rear end portion of the sensor element 10; and four metal terminals 21a, 21b, 22a, 22b (only two of them are shown in FIG. 1) provided between the sensor element 10 and the separator 166.

A gas detection portion 10a at a front end of the sensor element 10 is covered with a porous protection layer 20 of alumina or the like.

The metal shell 138 is made of stainless steel, has a through hole 154 penetrating in the axial-line direction, and is formed substantially in a tubular shape having a ledge portion 152 protruding radially inward of the through hole 154. In the through hole 154, the sensor element 10 is placed such that a front end portion of the sensor element 10 protrudes frontward relative to the front end of the through hole 154. The ledge portion 152 is formed as an inward taper surface sloped relative to a plane perpendicular to the axial-line direction.

Inside the through hole 154 of the metal shell 138, an annular ceramic holder 151 made of alumina, a powder filled layer 156 (hereinafter, also referred to as talc ring 156), and the aforementioned ceramic sleeve 106 are stacked in this order from the front side to the rear side so as to surround the radial-direction periphery of the sensor element 10.

A crimp packing 157 is provided between the ceramic sleeve 106 and a rear end portion 140 of the metal shell 138. The rear end portion 140 of the metal shell 138 is crimped so as to press the ceramic sleeve 106 toward the front side via the crimp packing 157.

On the other hand, as shown in FIG. 1, around the outer periphery at the front side (downward side in FIG. 1) of the metal shell 138, an outer protector 142 and an inner protector 143 as a double-layer protector having a plurality of holes and made of metal (e.g., stainless steel) are attached by welding or the like so as to cover a protruding part of the sensor element 10.

An outer casing 144 is fixed to the outer periphery at the rear side of the metal shell 138. At an opening on the rear side (upward side in FIG. 1) of the outer casing 144, a grommet 170 made of rubber is provided, and four lead wires 146 (only two of them are shown in FIG. 1) electrically connected to the four metal terminals 21a, 21b, 22a, 22b (only two of them are shown in FIG. 1) of the sensor element 10 pass through lead wire passage holes (not shown) formed in the grommet 170.

Further, a through hole 170h for introducing air as a reference atmosphere is formed at the center in the direction of the axial line O of the grommet 170, and filter fittings and a water-repellent filter (not shown) are held in the through hole 170h. Thus, air can be introduced between the inside and the outside of the gas sensor 200 via the through hole 170h.

The separator 166 is provided at the rear end side (upward side in FIG. 1) of the sensor element 10 protruding from the rear end portion 140 of the metal shell 138. The separator 166 is provided around a total of four electrode pads (see FIG. 2; only two electrode pads 11a, 12a are shown in FIG. 1) formed on main surfaces at the rear end side of the sensor element 10. The separator 166 is formed in a tubular shape having the element storage portion 168 described below, and has a flange portion 167 protruding radially outward from the outer surface. The separator 166 is held inside the outer casing 144 by the flange portion 167 contacting the outer casing 144 via a holding member 169.

As shown in FIG. 2, the sensor element 10 has a plate shape extending in the direction of the axial line O, and a front end portion 10s thereof serves as a gas detection portion 10a for detecting the concentration of oxygen. The gas detection portion 10a is covered with the porous protection layer 20. The sensor element 10 itself has a known configuration, i.e., although not shown, has a gas detection portion having an oxygen-ion-permeable solid electrolyte and a pair of electrodes, and a heater portion for heating the gas detection portion to keep the temperature thereof constant.

At a rear end 10E side on one main surface 10A of the sensor element 10, two electrode pads 11a, 11b are arranged in the direction of a width W, and a sensor output signal from the gas detection portion 10a is outputted from the electrode pads 11a, 11b via a lead portion (not shown). In addition, at the rear end side on another main surface 10B opposite the main surface 10A, two electrode pads 12a, 12b are arranged in the direction of the width W, whereby power is supplied to the heater portion via a lead portion (not shown).

In the present invention, it is only necessary that two or more electrode pads are arranged separately from each other in the direction of the width W on at least one of the main surfaces 10A, 10B.

The electrode pads 11a, 11b, 12a, 12b have a rectangular shape long in the direction of the axial line O, and can be formed as a sintered body mainly composed of Pt, for example.

The metal terminal 21a has, integrally, a plate-shaped body portion 21a1 extending in the direction of the axial line O, a front end portion 21a2 bent back from a front end of the body portion 21a1 toward the rear side, and a crimp terminal portion 21a3 connected to a rear end of the body portion 21a1.

In the present embodiment, the four metal terminals 21a, 21b, 22a, 22b all have the same shape and therefore only the metal terminal 21a has been described but the other metal terminals 21b, 22a, 22b have the same configuration as described above. Also, the same applies to the electrode pads 11a, 11b, 12a, 12b connected to the metal terminals 21a to 22b.

The crimp terminal portion 21a3 has a known tubular shape. Into this tube, a lead wire 146 with its coating removed so as to expose a conductive wire is inserted and then crimped together, whereby the lead wire 146 is electrically connected.

The distal end of the front end portion 21a2 is bent back toward the rear side, to form a free end. The front end portion 21a2 is (electrically) connected to the electrode pad 11a.

Each metal terminal 21a to 22b can be manufactured by stamping one metal plate (INCONEL (registered trademark), etc.) and then bending the front end portion 21a2, etc., for example. However, the manufacturing method is not limited thereto.

Next, the separator 166 will be described.

FIG. 3 is a perspective bottom view of the separator 166 as seen from the front side, FIG. 4 is a sectional view along line A-A in FIG. 3, and FIG. 5 is a perspective bottom view of the separator 166 at which the metal terminals 21a, 21b, 22a, 22b are held in FIG. 3.

At the center of the separator 166, an element storage portion 168 recessed toward the rear side from a front facing surface 166a of the separator 166 is provided. On radially outer sides of the element storage portion 168, two terminal storage holes 166h which are rectangular holes are arranged for each side (four holes in total), and each terminal storage hole 166h penetrates in the axial-line direction so as to communicate with a first storage space 168a (see FIG. 4) of the element storage portion 168.

As shown in FIG. 4, the element storage portion 168 includes the first storage space 168a at the front side and a second storage space 168b at the rear side, and the second storage space 168b has two rotation restriction walls 168w described below.

More specifically, as seen from the front side, the first storage space 168a has an H-shaped outline, and the second storage space 168b is located at a center part of a bottom surface 168s of the first storage space 168a. The outline of the second storage space 168b has a rectangular shape smaller than the outline of the first storage space 168a, and the long sides of the rectangle are along the transverse bar of the H shape.

The second storage space 168b is formed as a space recessed toward the rear side from the bottom surface 168s of the first storage space 168a, and the two rotation restriction walls 168w are side walls (walls along the direction of the axial line O) representing the long sides of the outline of the second storage space 168b.

As shown in FIG. 4, the rear end 10E side of the sensor element 10 is stored in the second storage space 168b. In FIG. 4, a surface along the thickness direction of the sensor element 10 is shown.

As shown in FIG. 5, the metal terminals 21a, 21b, 22a, 22b in a state of being separated so as not to contact with each other are held in the respective terminal storage holes 166h (see FIG. 3) of the separator 166 and face the element storage portion 168 (first storage space In a state in which the sensor element 10 is not stored in the element storage portion 168, the opposed front end portions 21a2, 22a2 of the metal terminals 21a, 22a, and the opposed front end portions 21b2, 22b2 of the metal terminals 21b, 22b, respectively contact each other by their elasticity.

Next, with reference to FIG. 6 and FIG. 7, rotation allowable angles 2θ, 2φ, and associated operations and effects, will be described. In FIG. 6, for facilitating visual understanding, only the metal terminal 21a of the metal terminals 21a, 21b, 22a, 22b is shown by a broken line and the other metal terminals are not shown.

A design position 10R in FIG. 6 is an ideal (design) placement position of the sensor element 10 in the separator 166. At the design position 10R, the electrode pads 11a to 12b of the sensor element 10 contact with the corresponding metal terminals 21a to 22b (the respective front end portions 21a2 to 22b2 thereof) almost in parallel thereto, so that the contact areas are maximized and the connection state is favorable. In addition, the distances between the respective electrode pads 11a to 12b and the corresponding metal terminals 21a to 22b are also almost the same, and therefore one-side contact or contact pressure reduction can be prevented and the connection state is favorable also in this regard.

Meanwhile, the outline of the first storage space 168a is larger than the outline of the second storage space 168b (and therefore the design position 10R). Therefore, at the time of inserting the sensor element 10 into the first storage space 168a of the separator 166 to assemble the gas sensor, even if the sensor element 10 is inserted so as to deviate in the circumferential direction from the design position 10R (see sensor element 10Y in FIG. 6), since the clearance between the first storage space 168a and the sensor element 10 is large, the sensor element 10 can be easily inserted into the separator 166 and thus productivity is improved.

For example, in FIG. 6, the sensor element 10 can rotate inside the first storage space 168a in the circumferential direction around the axial line O until abutting a protrusion 166p forming the outline of the first storage space 168a and protruding radially inward. At this time, where the maximum angle at which the sensor element 10 can rotate around the axial line O in the first storage space 168a is denoted by φ, 2φ is defined as a "rotation allowable angle in the first storage space 168a".

The reason why φ is doubled is that, in the first storage space 168a, the sensor element 10 can rotate upward in FIG. 6 and can also rotate downward in FIG. 6 line-symmetrically with respect to a left-right line in FIG. 6.

On the other hand, the outline of the second storage space 168b is smaller than the outline of the first storage space 168a. Thus, when the rear end 10E side of the sensor element 10 is stored in the second storage space 168b (see FIG. 1 and FIG. 4), a rotation allowable angle 2θ in the first storage space 168a becomes smaller than 2φ.

For example, in FIG. 6, the sensor element 10 can rotate inside the second storage space 168b around the axial line O until abutting the rotation restriction wall 168w forming the outline of the second storage space 168b (see sensor element 10x in FIG. 6).

Here, the maximum angle at which the sensor element 10 can rotate around the axial line O in the second storage space 168b is denoted by θ. In addition, as in the case of 2φ, 2θ is defined as a "rotation allowable angle in the second storage space 168b".

In this example, at the design position 10R, directions along the main surfaces 10A, 10B (see FIG. 2) of the sensor element 10 are parallel to the extending directions of the rotation restriction walls 168w. The outline of the second storage space 168b is located on the outer side of the design position 10R, but is preferably as close to the design position 10R as possible.

As described above, the rear end 10E side of the sensor element 10 is stored in the second storage space 168b in which the rotation allowable angle is smaller (2θ<2φ) than in the first storage space 168a. Therefore, for example, even when a force causing rotation in the circumferential direction is applied to the separator 166 due to vibration while operating the vehicle, the rotation angle of the sensor element 10 held in the second storage space 168b is kept small (within 2θ).

As a result, as shown in FIG. 7, a phenomenon in which the distance between each electrode pad 11a to 12b of the sensor element 10 and the corresponding metal terminal 21a to 22b (the front end portion 21a2 to 22b2 thereof) becomes too short so that they contact with each other obliquely (one-side contact) or the distance therebetween becomes too long so that the contact pressure is reduced, is prevented. Thus, contact failure is suppressed and connection reliability between the electrode pads and the metal terminals can be improved.

Here, in FIG. 7, i.e., in a state in which the rear end 10E side of the sensor element 10 is stored in the second storage space 168b, the respective electrode pads 11a to 12b and the corresponding metal terminals 21a to 22b (front end portions) are all connected to each other. In other words, 2θ is set so that the respective electrode pads 11a to 12b and the corresponding metal terminals 21a to 22b (front end portions) are all connected to each other.

On the other hand, in a case where the rear end 10E side of the sensor element 10 abuts a part (e.g., the bottom surface 168s in FIG. 4) between the first storage space 168a and the second storage space 168b when the sensor element 10 is inserted so as to deviate in the circumferential direction, the rear end 10E side of the sensor element 10 is not stored in the second storage space 168b, and thus the product is eliminated as a manufacturing fault.

The manufacturing fault can be detected from an insertion load of the sensor element 10 into the separator 166, the insertion depth thereof, or the like, for example.

Preferably, the rotation allowable angle 2θ in the second storage space 168b is not greater than 90 degrees. If 2θ is greater than 90 degrees, it might be difficult to connect all the respective electrode pads 11a to 12b and the corresponding metal terminals 21a to 22b (front end portions). More preferably, the rotation allowable angle 2θ is not greater than 20 degrees.

Spacing the element storage portion 168 apart from the sensor element 10 can prevent the second element 10 from being broken by contacting the element storage portion 168 (in particular, the second storage space 168b) due to vibration while operating the vehicle, or the like.

The present invention is not limited to the above embodiment, and includes various modifications and equivalents encompassed by the concept and the scope of the present invention.

For example, as shown in FIG. 8, an element storage portion 268 of the separator 266 may be a hole penetrating in the direction of the axial line O. In the example in FIG. 8, a second storage space 268b is formed as a rectangular through hole, and two side walls of this through hole (side walls representing long sides of the outline of the second storage space 168b) form rotation restriction walls 268w.

Also, the configuration of the rotation restriction walls is not limited. For example, a pair of protrusions as shown in FIG. 9 may be formed as rotation restriction walls 368w.

Figure 9:
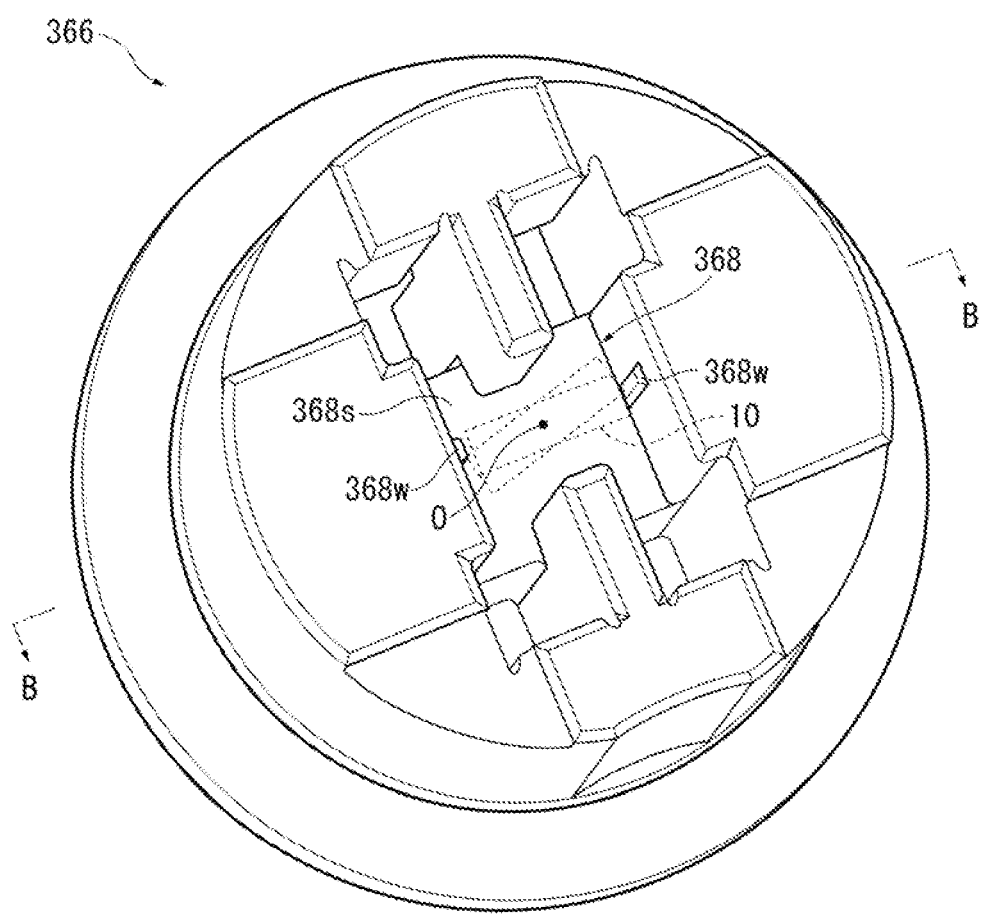
FIG. 9 is a perspective bottom view of a separator in another modification as seen from the front side.

Here, in a separator 366 shown in FIG. 9, an element storage portion 368 is a recess, and a first storage space 368a having an H-shaped outline similar to the first storage space 168a is formed. The rotation restriction walls 368w are formed so as to protrude toward the axis O (center) from a pair of side walls that are along the thickness direction (short sides) of the sensor element 10 and extend from a bottom surface 368s of the first storage space 368a toward the front side (see FIG. 10).

In this case, in a state in which the rear end 10E side of the sensor element 10 is inserted in the vicinity of the bottom surface 368s, even if the sensor element 10 rotates around the axial line O, the rotation is hampered when each short side of the sensor element 10 abuts the rotation restriction wall 368w. As a result, 2θ<2φ is satisfied.

Figure 10:
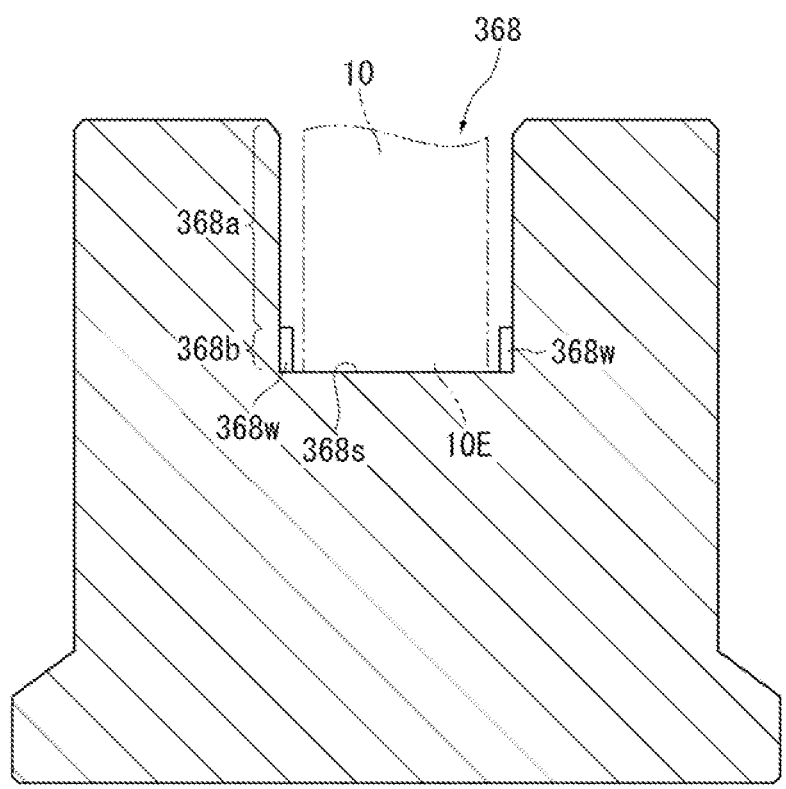
FIG. 10 is a sectional view along line B-B in FIG. 9.
Figure 11:
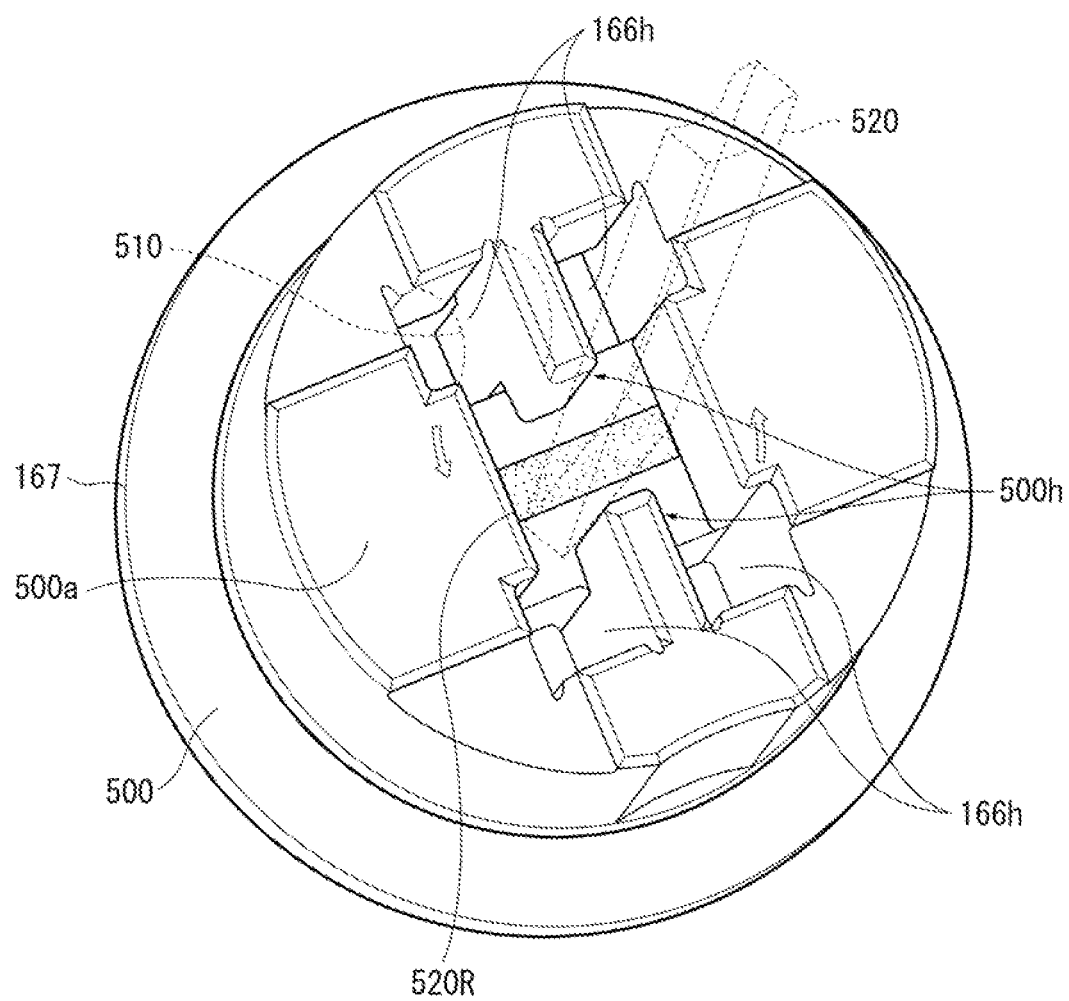
FIG. 11 is a perspective bottom view showing a state in which a sensor element is held at a design position when the sensor element is inserted into a separator in a conventional gas sensor.
Figure 12:
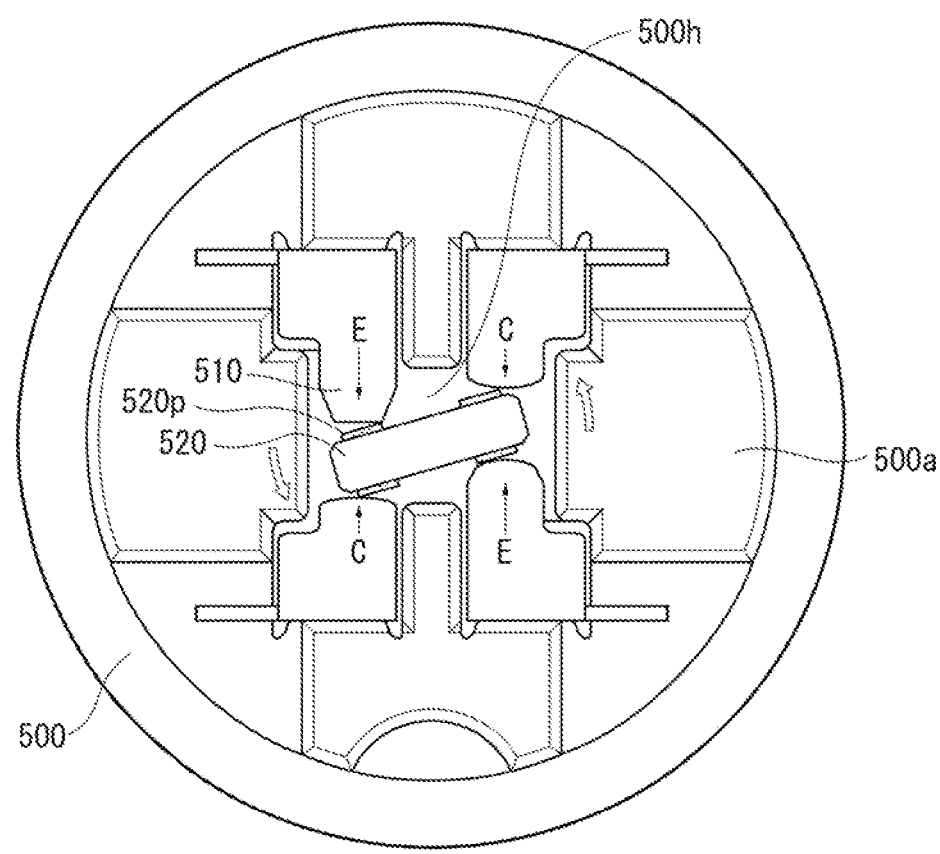
FIG. 12 is a perspective bottom view showing a state in which the separator has rotated from the design position due to vibration during use in the conventional gas sensor.
Figure 13:
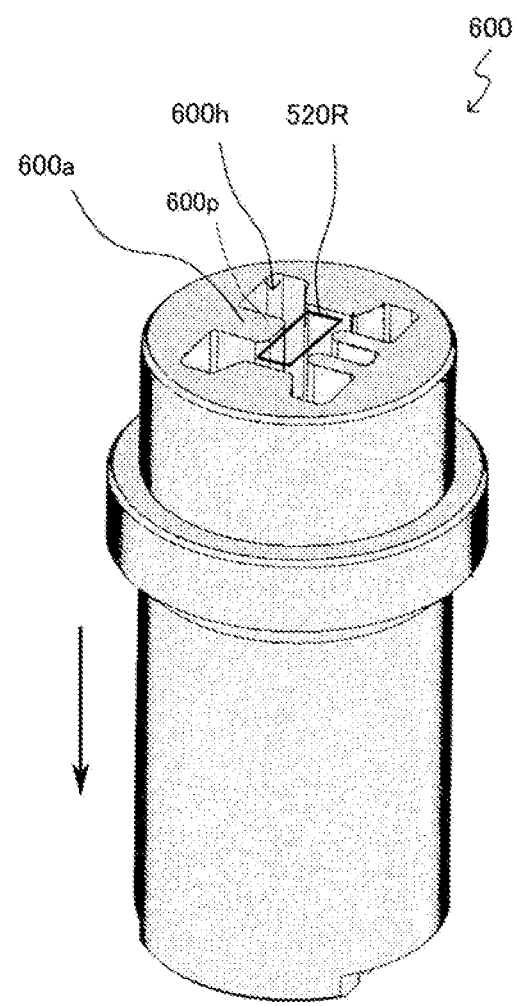
FIG. 13 is a perspective bottom view showing a state in which a sensor element is inserted into a separator in another conventional gas sensor.

Here, as shown in FIG. 10 which is a sectional view of FIG. 9, a space formed between the two rotation restriction walls 368w is a second storage space 368b. In FIG. 10, a main surface of the sensor element 10 is shown.

Also, the configurations of the separator, the metal terminals, and the electrode pads are not limited.

Examples of types of the gas sensor include, besides an oxygen sensor, a full-range air/fuel ratio sensor and a NOx sensor.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

The invention claimed is:

1. A gas sensor comprising:
a sensor element formed in a plate shape extending in an axial-line direction and having main surfaces opposed to each other, the sensor element having two or more electrode pads separated from each other in a width direction at a rear end side on at least one of the main surfaces;
a separator made of an insulating material and provided at a rear end side of the sensor element; and
a plurality of metal terminals held by the separator and arranged so as to be opposed to the electrode pads, the plurality of metal terminals each having a body portion extending in the axial-line direction and a front end portion which is contiguous to a front end of the body portion and connected to the corresponding electrode pad, the plurality of metal terminals being insulated from each other by the separator, wherein
the separator has an element storage portion penetrating in the axial-line direction or recessed toward a rear side from a front facing surface of the separator,
the element storage portion has a first storage space at a front side thereof and a second storage space at a rear side thereof,
the second storage space has a rotation restriction wall configured such that a relative rotation allowable angle between the sensor element and the separator is smaller than in the first storage space,
the rear end side of the sensor element is stored in the second storage space,
a depth of the first storage space in the axial-line direction is longer than a depth of the second storage space in the axial-line direction, and
the plurality of metal terminals are arranged in the first storage space.

2. The gas sensor as claimed in claim 1, wherein the rotation allowable angle in the second storage space is not greater than 90 degrees.

3. The gas sensor as claimed in claim 2, wherein the rotation allowable angle is not greater than 20 degrees.

4. The gas sensor as claimed in claim 1, wherein the element storage portion is spaced apart from the sensor element.

5. The gas sensor as claimed in claim 2, wherein the element storage portion is spaced apart from the sensor element.

6. The gas sensor as claimed in claim 3, wherein the element storage portion is spaced apart from the sensor element.

7. The gas sensor as claimed in claim 1, wherein the second storage space does not penetrate an entire length of the separator in the axial-line direction.

8. The gas sensor as claimed in claim 1, wherein the first storage space has a wall that is parallel to the axial-line direction.

* * * * *